United States Patent
Lin

(10) Patent No.: US 10,482,585 B1
(45) Date of Patent: Nov. 19, 2019

(54) IMAGE RECORDING DEVICE AND IMAGE PROCESSING METHOD THEREFOR

(71) Applicant: COMPAL ELECTRONICS, INC., Taipei (TW)

(72) Inventor: Chung-Hsiang Lin, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/178,353

(22) Filed: Nov. 1, 2018

(30) Foreign Application Priority Data

Sep. 10, 2018 (TW) .............................. 107131741 A

(51) Int. Cl.
 *H04N 5/235* (2006.01)
 *G06T 5/00* (2006.01)
(52) U.S. Cl.
 CPC ........... *G06T 5/009* (2013.01); *H04N 5/2351* (2013.01); *H04N 5/2353* (2013.01); *H04N 5/2355* (2013.01); *G06T 2207/10016* (2013.01); *G06T 2207/20208* (2013.01)
(58) Field of Classification Search
 CPC ........... G06T 5/009; G06T 2207/20208; G06T 2207/10016; H04N 5/2351; H04N 5/2353; H04N 5/2355
 See application file for complete search history.

(56) References Cited

U.S. PATENT DOCUMENTS

| | | | | |
|---|---|---|---|---|
| 7,146,059 | B1* | 12/2006 | Durand | G06T 5/007 |
| | | | | 382/260 |
| 8,824,829 | B2* | 9/2014 | Rempel | G09G 3/3426 |
| | | | | 345/690 |
| 9,230,312 | B2* | 1/2016 | Paris | G06T 5/009 |
| 2011/0279710 | A1* | 11/2011 | Lee | H04N 5/2351 |
| | | | | 348/234 |
| 2014/0192227 | A1* | 7/2014 | Zhang | H04N 5/2355 |
| | | | | 348/230.1 |
| 2017/0154456 | A1* | 6/2017 | Cao | H04N 5/2355 |

\* cited by examiner

*Primary Examiner* — Padma Haliyur
(74) *Attorney, Agent, or Firm* — Kirton McConkie; Evan R. Witt

(57) ABSTRACT

The present disclosure provides an image recording device and an image processing method. The tone adjusting unit includes plural preset tone mapping adjusting curves. The auto exposure unit compares and obtains the nearest brightness interval from plural brightness intervals according to the image information of the original dynamic image. The tone adjusting unit chooses the corresponding tone mapping adjusting curve from the plural tone mapping adjusting curves to adjust the brightness of the original dynamic image according to the brightness interval. Therefore, the image recording device and the image processing method of the present disclosure takes different tone mapping adjusting curves to adjust the brightness of the original dynamic image according to different brightness of the original dynamic image. The image recording device of the present disclosure adjusts the brightness according to different brightness of the original dynamic image. Consequently, the image quality of the adjusted dynamic image is improved.

14 Claims, 4 Drawing Sheets

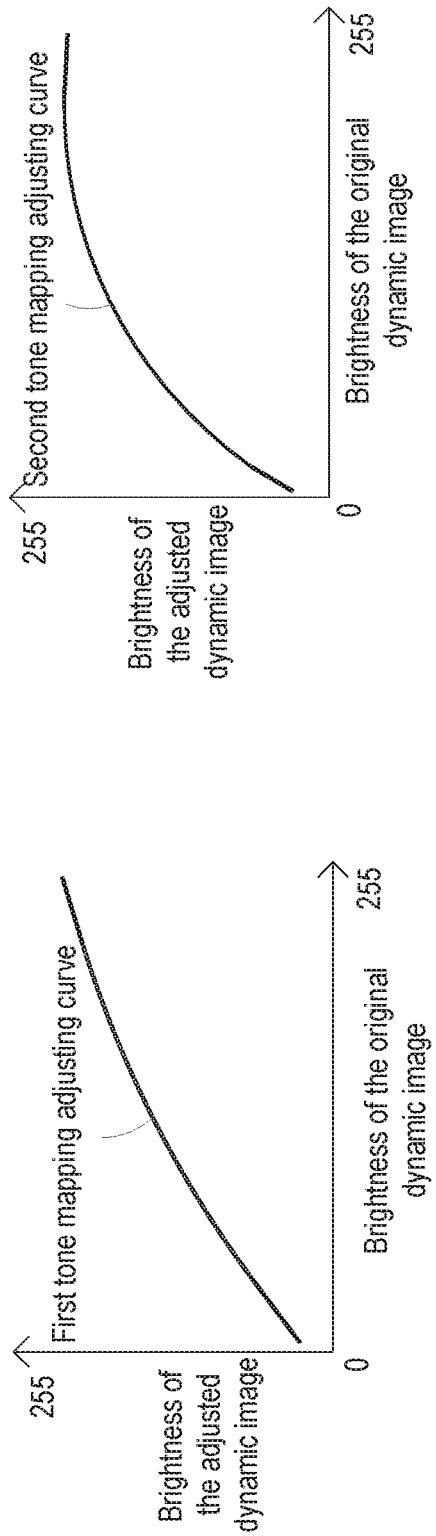

IMAGE RECORDING DEVICE AND IMAGE PROCESSING METHOD THEREFOR

CROSS-REFERENCE TO RELATED APPLICATION

This application claims priority to Taiwan Patent Application No. 107131741 filed on Sep. 10, 2018, the entire contents of which are incorporated herein by reference for all purposes.

FIELD OF THE DISCLOSURE

The present disclosure relates to an image recording device and an image processing method, and more particularly to an image recording device and an image processing method capable of producing High Dynamic Range image by using different tone mapping adjusting curves according to different brightness to obtain better dynamic image quality.

BACKGROUND OF THE DISCLOSURE

In the current technology, the image recording device, such as the digital camera or the video recorder, is configured to capture the dynamic image (such as the video). Generally, the image recording device has the function of capturing and generating the high dynamic range (HDR) image, which allows the areas between the brightest and the darkest has the bigger dynamic range. Therefore, the image recording device has the better image color expression when the image recording device photos or dynamically records.

At present, the image recording device has two methods to capture and generate the high dynamic range image. One is the interlaced video high dynamic range imaging technology, and the other is the zig zag video high dynamic range (ZZHDR) imaging technology. Since the zig zag video high dynamic range imaging technology has the benefits of outputting the high dynamic range image at faster speed and having reduced size, the zig zag video high dynamic range imaging technology is widely applies to the image recording device.

After the image recording device using the zig zag video high dynamic range imaging technology captures the original dynamic images, the image recording device utilizes a preset single adjusting value to adjust and compensate the brightness of the original dynamic images to output compensated dynamic images. However, no matter the original dynamic image is captured in any brightness, the image recording device using the zig zag video high dynamic range imaging technology only applies the same adjusting value to adjust and compensate the brightness of the original dynamic image. Therefore, the image quality of the adjusted dynamic image outputted from the image recording device using the zig zag video high dynamic range imaging technology is worse. For example, when the brightness of the original dynamic image captured by the image recording device is adjusted and compensated based on the single adjusting value, the brightness at a low-brightness area of the original dynamic image can be adjusted to rise to an appropriate brightness. However, the brightness at a high-brightness area of the original dynamic image can only be adjusted with the same adjusting value to raise the brightness. Therefore, the brightness of the high-brightness area of the original dynamic image is subject to overexposure. Consequently, the image quality of the adjusted dynamic image outputted from the image recording device using the zig zag video high dynamic range imaging technology is worse.

Therefore, there is a need of providing an image recording device and an image processing method in order to address the above issues.

SUMMARY OF THE DISCLOSURE

The present disclosure provides an image recording device and an image processing method for capturing and generating high dynamic range image. The image recording device includes plural preset and different tone mapping adjusting curves and chooses a corresponding tone mapping adjusting curve from the plural tone mapping adjusting curves to adjust the brightness of the original dynamic image according to the different image information of the original dynamic image so as to obtain better dynamic image quality.

In accordance with an aspect of the present disclosure, an image recording device is provided. The image recording device includes a detecting module and an image signal output module. The detecting module includes a detecting unit, a data statistics unit and a tone adjusting unit. The detecting unit is configured to capture an original dynamic image according to an exposure value and output an image information of the original dynamic image. The data statistics unit is connected with the detecting unit for receiving the image information of the original dynamic image, gathering the statistics of the image information of the original dynamic image and outputting the image information of the original dynamic image. The tone adjusting unit is connected with the detecting unit and includes plural preset and different tone mapping adjusting curves. The tone adjusting unit is configured to receive the image information of the original dynamic image, adjust the brightness of the original dynamic image to obtain an adjusted dynamic image according to one of the plural preset and different tone mapping adjusting curves and output the image information of the adjusted dynamic image. The auto exposure unit is connected with the data statistics unit, the detecting unit and the tone adjusting unit. The auto exposure unit includes plural preset brightness intervals. The auto exposure unit receives the image information of the original dynamic image transmitted from the data statistics unit and issues a first instruction to the detecting unit according to the image information of the original dynamic image. The detecting unit adjusts the exposure value according to the first instruction. The auto exposure unit compares and obtains a nearest brightness interval from the plural brightness intervals according to the image information of the original dynamic image and issues a second instruction to the tone adjusting unit according to the nearest brightness interval. The tone adjusting unit chooses the corresponding tone mapping adjusting curve from the plural tone mapping adjusting curves to adjust the brightness of the original dynamic image according to the second instruction and outputs the image information of the adjusted dynamic image. The dynamic contrast adjusting unit is connected with the tone adjusting unit for receiving the image information of the adjusted dynamic image transmitted from the tone adjusting unit and outputting the adjusted dynamic image correspondingly.

In accordance with an aspect of the present disclosure, an image processing method for an image recording device is provided. The image recording device includes a detecting module and an image signal output module. The detecting module includes a detecting unit, a data statistics unit and a tone adjusting unit. The tone adjusting unit includes plural preset and different tone mapping adjusting curves. The image signal output module includes an auto exposure unit and a dynamic contrast adjusting unit. The auto exposure unit includes plural preset brightness intervals. The image processing method includes the following steps. Firstly, a step S1 is performed. In the step S1, the detecting unit is enabled to capture an original dynamic image according to an exposure value and output an image information of the original dynamic image. Then, a step S2 is performed. In the step S2, the data statistics unit receives the image information of the original dynamic image, gathers the statistics of the image information of the original dynamic image and outputs the image information of the original dynamic image. Then, a step S3 is performed. In the step S3, the auto exposure unit receives the image information of the original dynamic image transmitted from the data statistics unit and issues a first instruction to the detecting unit according to the image information of the original dynamic image. The detecting unit adjusts the exposure value according to the first instruction. The auto exposure unit compares and obtains a nearest brightness interval from the plural brightness intervals according to the image information of the original dynamic image and issues a second instruction to the tone adjusting unit according to the nearest brightness interval. The tone adjusting unit chooses the corresponding tone mapping adjusting curve from plural tone mapping adjusting curves to adjust the brightness of the original dynamic image according to the second instruction and outputs the image information of the adjusted dynamic image. Then, a step S4 is performed. In the step S4, the dynamic contrast adjusting unit receives the image information of the adjusted dynamic image transmitted from the tone adjusting unit and outputs the adjusted dynamic image correspondingly.

The above contents of the present disclosure will become more readily apparent to those ordinarily skilled in the art after reviewing the following detailed description and accompanying drawings, in which:

BRIEF DESCRIPTION OF THE DRAWINGS

FIG. 2A is a curve diagram illustrating a first tone mapping adjusting curve preset in a tone adjusting unit of FIG. 1;

FIG. 2B is a curve diagram illustrating a second tone mapping adjusting curve preset in the tone adjusting unit of FIG. 1;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
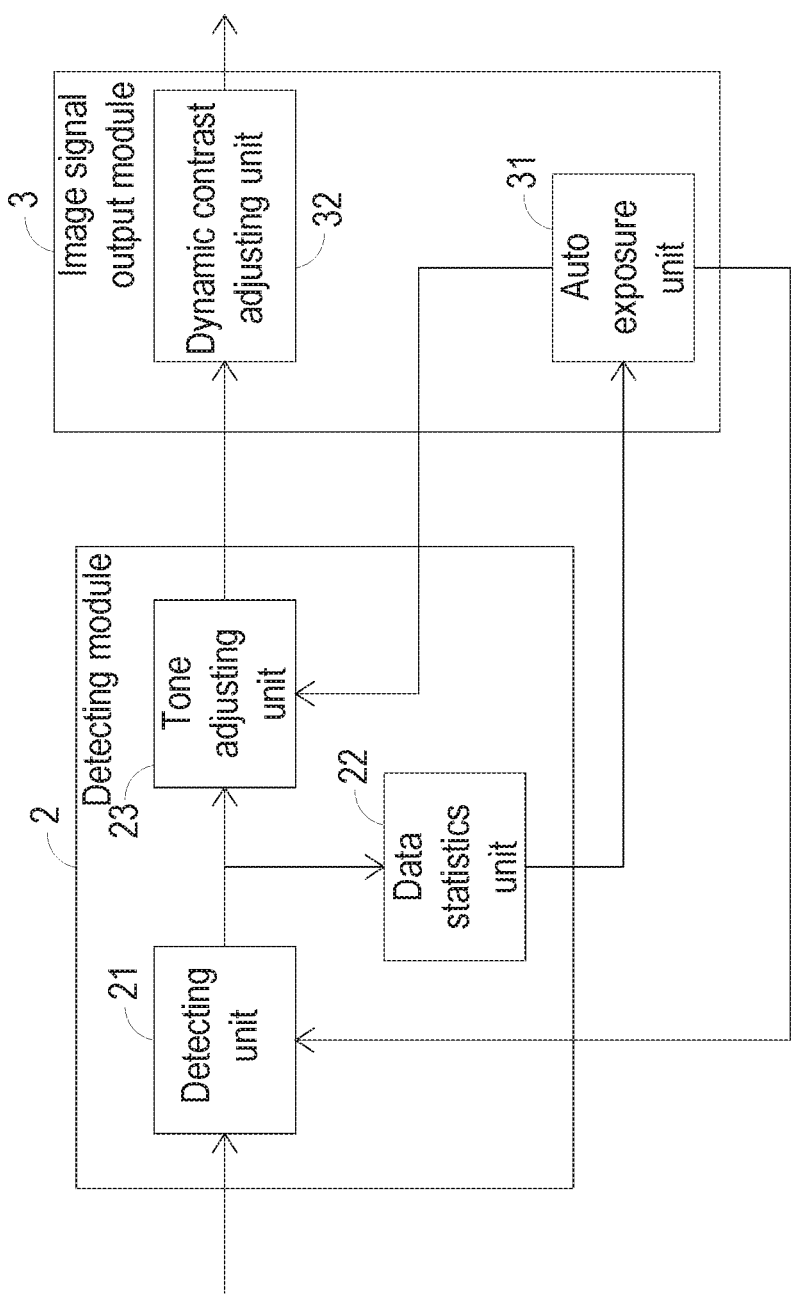
FIG. 1 is a schematic block diagram illustrating an image recording device according to an embodiment of the present disclosure.

FIG. 1 is a schematic block diagram illustrating an image recording device according to an embodiment of the present disclosure. As shown in FIG. 1, preferably but not exclusively, the image recording device 1 uses the zig zag video high dynamic range imaging technology. The image recording device 1 includes a detecting module 2 and an image signal output module 3. The detecting module 2 includes a detecting unit 21, a data statistics unit 22 and a tone adjusting unit 23.

The detecting unit 21 is configured to capture an original dynamic image according to an exposure value, such as an aperture value, a shutter value or an ISO sensitivity and configured to output the image information of the original dynamic image. The data statistics unit 22 is connected with the detecting unit 21 and configured to receive the image information of the original dynamic image transmitted from the detecting unit 21, gather the statistics of the image information of the original dynamic image and output the image information of the original dynamic image, such as the brightness information of the original dynamic image. The tone adjusting unit 23 is connected with the detecting unit 21 and includes plural preset tone mapping adjusting curves. The plural tone mapping adjusting curves are different from each other. The tone adjusting unit 23 is configured to receive the image information of the original dynamic image transmitted from the detecting unit 21, adjust the brightness of the original dynamic image to generate an adjusted dynamic image according to one of the plural preset and different tone mapping adjusting curves and output the image information of the adjusted dynamic image.

The image signal output module 3 includes an auto exposure unit 31 and a dynamic contrast adjusting unit 32. The auto exposure unit 31 is connected with the data statistics unit 22, the detecting unit 21 and the tone adjusting unit 23. The auto exposure unit 31 includes plural preset brightness intervals. The plural brightness intervals are different from each other. The numbers of the brightness intervals are corresponding to the numbers of the tone mapping adjusting curves. Each one of the brightness intervals is corresponding to the different one of the tone mapping adjusting curves. The auto exposure unit 31 is configured to receive the image information of the original dynamic image transmitted from the data statistics unit 22 and issue a first instruction to the detecting unit 21 according to the image information of the original dynamic image. In response to the first instruction transmitted from the auto exposure unit 31, the detecting unit 21 is enabled to adjust the exposure value for capturing the original dynamic image according to the first instruction. Moreover, the auto exposure unit 31 compares and obtains the nearest brightness interval from the plural brightness intervals according to the image information of the original dynamic image. Then, the auto exposure unit 31 issues a second instruction to the tone adjusting unit 23 according to the nearest brightness interval. In response to the second instruction transmitted from the auto exposure unit 31, the tone adjusting unit 23 is enabled to choose a corresponding tone mapping adjusting curve from the plural tone mapping adjusting curves to adjust the brightness of the original dynamic image according to the second instruction. Then, the tone adjusting unit 23 outputs the image information of the adjusted dynamic image. The dynamic contrast adjusting unit 32 is connected with the tone adjusting unit 23 to receive the image information of the adjusted dynamic image transmitted from the tone adjusting unit 23 and output the adjusted dynamic image according to the image information of the adjusted dynamic image.

In this embodiment, a curvature of the tone mapping adjusting curve is the ratio between the brightness of the original dynamic image and the brightness of the adjusted dynamic image. The setting of the ratio of each one of the tone mapping adjusting curves is preset in the tone adjusting unit 23 before the image recording device 1 is produced. The original dynamic image is transformed to the adjusted dynamic image in different brightness, and the ratio of each one of the tone mapping adjusting curves is preset in the tone adjusting unit 23 according to the quality of the adjusted dynamic image accepted by the user.

FIG. 2A is a curve diagram illustrating a first tone mapping adjusting curve preset in a tone adjusting unit of FIG. 1. FIG. 2B is a curve diagram illustrating a second tone mapping adjusting curve preset in the tone adjusting unit of FIG. 1. In some embodiments, as shown in FIGS. 2A and 2B, the numbers of the tone mapping adjusting curves are two. A first tone mapping adjusting curve is shown in FIG. 2A, and a second tone mapping adjusting curve is shown in FIG. 2B. The X axes of the first tone mapping adjusting curve and the second tone mapping adjusting curve are the brightness of the original dynamic image. The Y axes of the first tone mapping adjusting curve and the second tone mapping adjusting curve are the brightness of the adjusted dynamic image. As shown in FIGS. 2A and 2B, the curvature of the first tone mapping adjusting curve is less than the curvature of the second tone mapping adjusting curve.

As mentioned above, the plural tone mapping adjusting curves include the first tone mapping adjusting curve and the second tone mapping adjusting curve. Therefore, the plural brightness intervals correspondingly include a first brightness interval and a second brightness interval. An ISO sensitivity of the first brightness interval is but not limited to more than 800. An ISO sensitivity of the second brightness interval is but not limited to less than or equal to 800. When the auto exposure unit 31 chooses the first brightness interval from the plural brightness intervals according to the image information of the original dynamic image, the tone adjusting unit 23 is enabled to choose the first tone mapping adjusting curve to adjust the brightness of the original dynamic image according to the second instruction. On the contrary, when the auto exposure unit 31 chooses the second interval from the plural brightness intervals according to the image information of the original dynamic image, the tone adjusting unit 23 is enabled to choose the second tone mapping adjusting curve to adjust the brightness of the original dynamic image according to the second instruction.

Figure 3A:
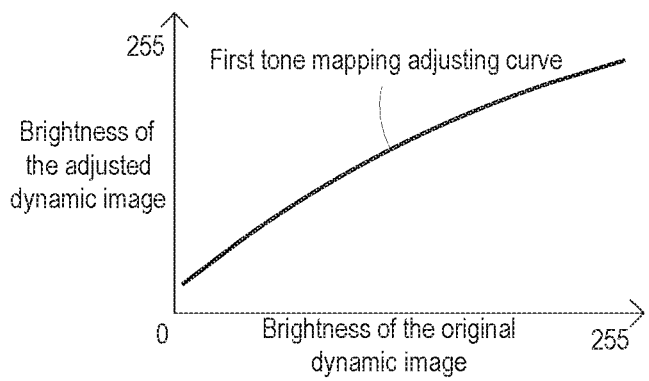
FIG. 3A is a curve diagram illustrating a first tone mapping adjusting curve preset in the tone adjusting unit of FIG. 1.
Figure 3B:
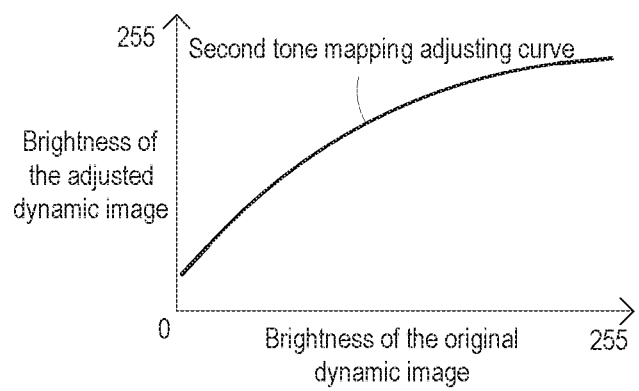
FIG. 3B is a curve diagram illustrating a second tone mapping adjusting curve preset in the tone adjusting unit of FIG. 1.
Figure 3C:
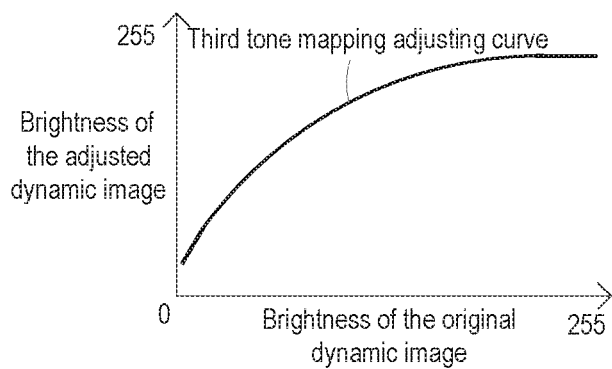
FIG. 3C is a curve diagram illustrating a third tone mapping adjusting curve preset in the tone adjusting unit of FIG. 1.

FIG. 3A is a curve diagram illustrating a first tone mapping adjusting curve preset in the tone adjusting unit of FIG. 1. FIG. 3B is a curve diagram illustrating a second tone mapping adjusting curve preset in the tone adjusting unit of FIG. 1. FIG. 3C is a curve diagram illustrating a third tone mapping adjusting curve preset in the tone adjusting unit of FIG. 1. In some embodiments, the numbers of the tone mapping adjusting curves are not limited to two. As shown in FIGS. 3A, 3B and 3C, the numbers of the tone mapping adjusting curves are three. A first tone mapping adjusting curve first is shown in FIG. 3A, a second tone mapping adjusting curve is shown in FIG. 3B, and a third tone mapping adjusting curve is shown in FIG. 3C. The X axes of the first tone mapping adjusting curve, the second tone mapping adjusting curve and the third tone mapping adjusting curve are the brightness of the original dynamic image. The Y axes of the first tone mapping adjusting curve, the second tone mapping adjusting curve and the third tone mapping adjusting curve are the brightness of the adjusted dynamic image. As shown in FIGS. 3A, 3B and 3C, the curvature of the first tone mapping adjusting curve is less than the curvature of the second tone mapping adjusting curve, and the curvature of the second tone mapping adjusting curve is less than the curvature of the third tone mapping adjusting curve.

As mentioned above, the plural tone mapping adjusting curves include the first tone mapping adjusting curve, the second tone mapping adjusting curve and the third tone mapping adjusting curve. Therefore, the plural brightness intervals correspondingly include a first brightness interval, a second brightness interval and a third brightness interval. An ISO sensitivity of the first brightness interval is but not limited to more than 800. An ISO sensitivity of the second brightness interval is but not limited to less than or equal to 800 and more than 400. An ISO sensitivity of the third brightness interval is but not limited to less than or equal to 400. When the auto exposure unit 31 chooses the first brightness interval from the plural brightness intervals according to the image information of the original dynamic image, the tone adjusting unit 23 is enabled to choose the first tone mapping adjusting curve to adjust the brightness of the original dynamic image according to the second instruction. When the auto exposure unit 31 chooses the second brightness interval from the plural brightness interval according to the image information of the original dynamic image, the tone adjusting unit 23 is enabled to choose the second tone mapping adjusting curve to adjust the brightness of the original dynamic image according to the second instruction. When the auto exposure unit 31 chooses the third brightness interval from the plural brightness intervals according to the image information of the original dynamic image, the tone adjusting unit 23 is enabled to choose the third tone mapping adjusting curve to adjust the brightness of the original dynamic image according to the second instruction.

It is noted that the numbers of the tone mapping adjusting curves and the numbers of the brightness intervals are not limited to two or three. The numbers of the tone mapping adjusting curves and the numbers of the brightness intervals may be four or more, and are not redundantly described herein.

Figure 4:
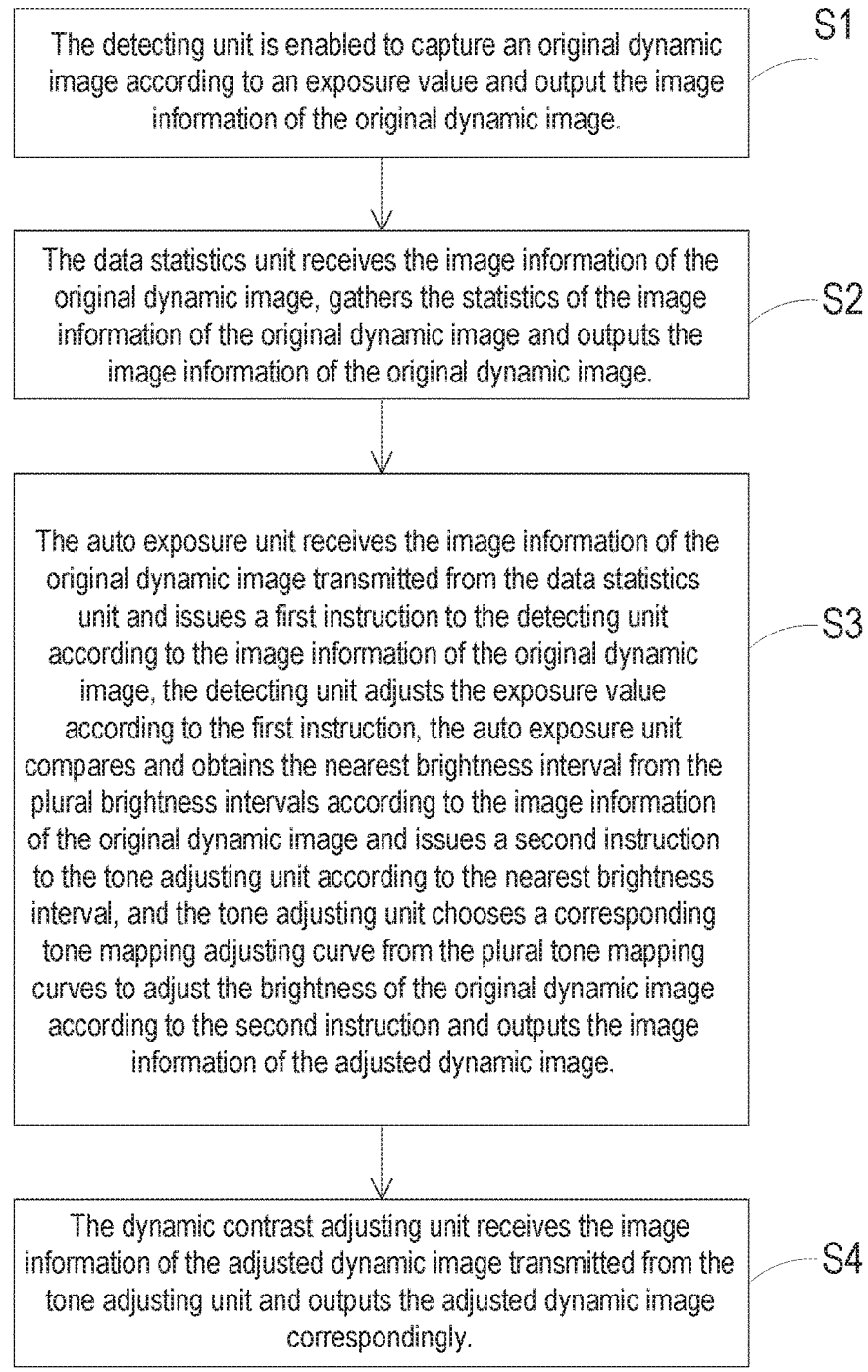
FIG. 4 is a flowchart illustrating an image processing method for the image recording device of FIG. 1.

FIG. 4 is a flowchart illustrating an image processing method for the image recording device of FIG. 1. As shown in FIG. 4, firstly, a step S1 is performed. In the step S1, the detecting unit 21 is enabled to capture an original dynamic image according to an exposure value and output the image information of the original dynamic image. Then, a step S2 is performed. In the step S2, the data statistics unit 22 receives the image information of the original dynamic image, gathers the statistics of the image information of the original dynamic image and outputs the image information of the original dynamic image, for example the brightness of the original dynamic image. Then, a step S3 is performed. In the step S3, the auto exposure unit 31 receives the image information of the original dynamic image transmitted from the data statistics unit 22 and issues a first instruction to the detecting unit 21 according to the image information of the original dynamic image. In response to the first instruction, the detecting unit 21 adjusts the exposure value according to the first instruction. The auto exposure unit 31 compares and obtains the nearest brightness interval of the plural brightness intervals according to the image information of the original dynamic image and issues a second instruction to the tone adjusting unit 23 according to the nearest brightness interval. In response to the second instruction, the tone adjusting unit chooses a corresponding tone mapping adjusting curve from the plural tone mapping adjusting curves to adjust the brightness of the original dynamic image according to the second instruction and outputs the image information of the adjusted dynamic image. Then, a step S4 is performed. In the step S4, the dynamic contrast adjusting unit 32 receives the image information of the adjusted dynamic image transmitted from the tone adjusting unit 23 and outputs the adjusted dynamic image correspondingly.

From the above descriptions, the present disclosure provides an image recording device and an image processing method. The tone adjusting unit includes plural preset tone mapping adjusting curves. The auto exposure unit compares and obtains the nearest brightness interval from the plural brightness intervals according to the image information of the original dynamic image. The tone adjusting unit chooses a corresponding tone mapping adjusting curve from the plural tone mapping adjusting curves to adjust the brightness of the original dynamic image according to the brightness interval chosen by the auto exposure unit. Therefore, the image recording device and the image processing method of the present disclosure takes the different tone mapping adjusting curves to adjust the brightness of the original dynamic image according to the different brightness of the original dynamic image. Moreover, the conventional image recording device uses a single adjusting value to adjust the brightness of the original dynamic image in any brightness of the original dynamic image. Comparing with the conventional image recording device, the image recording device of the present disclosure adjusts the brightness according to the different brightness of the original dynamic image. The adjusted dynamic image outputted from the dynamic contrast adjusting unit of the image recording unit obtains the better dynamic image quality.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image recording device, comprising:
   a detecting module, comprising:
   a detecting unit configured to capture an original dynamic image according to an exposure value and output an image information of the original dynamic image;
   a data statistics unit connected with the detecting unit for receiving the image information of the original dynamic image, gathering the statistics of the image information of the original dynamic image and outputting the image information of the original dynamic image; and
   a tone adjusting unit connected with the detecting unit and comprising plural preset and different tone mapping adjusting curves, wherein the tone adjusting unit is configured to receive the image information of the original dynamic image, adjust the brightness of the original dynamic image to obtain an adjusted dynamic image according to one of the plural preset and different tone mapping adjusting curves and output the image information of the adjusted dynamic image; and
   an image signal output module, comprising:
   an auto exposure unit connected with the data statistics unit, the detecting unit and the tone adjusting unit, and comprising plural preset brightness intervals, wherein the auto exposure unit receives the image information of the original dynamic image transmitted from the data statistics unit and issues a first instruction to the detecting unit according to the image information of the original dynamic image, the detecting unit adjusts the exposure value according to the first instruction, the auto exposure unit compares and obtains a nearest brightness interval from the plural brightness intervals according to the image information of the original dynamic image and issues a second instruction to the tone adjusting unit according to the nearest brightness interval, and the tone adjusting unit chooses the corresponding tone mapping adjusting curve from the plural tone mapping adjusting curves to adjust the brightness of the original dynamic image according to the second instruction and outputs the image information of the adjusted dynamic image; and
   a dynamic contrast adjusting unit connected with the tone adjusting unit for receiving the image information of the adjusted dynamic image transmitted from the tone adjusting unit and outputting the adjusted dynamic image correspondingly.

2. The image recording device according to claim 1, wherein a curvature of the tone mapping adjusting curve is the ratio between the brightness of the original dynamic image and the brightness of the adjusted dynamic image.

3. The image recording device according to claim 2, wherein the plural tone mapping adjusting curves comprise a first tone mapping adjusting curve and a second tone mapping adjusting curve, wherein the curvature of the first tone mapping adjusting curve is less than the curvature of the second tone mapping adjusting curve.

4. The image recording device according to claim 3, wherein the plural brightness intervals comprise a first brightness interval and a second brightness interval, wherein an ISO sensitivity of the first brightness interval is more than 800, an ISO sensitivity of the second brightness interval is less than or equal to 800, wherein when the auto exposure unit chooses the first brightness interval form the plural brightness interval according to the image information of the original dynamic image, the tone adjusting unit chooses the first tone mapping adjusting curve to adjust the brightness of the original dynamic image according to the second instruction, wherein when the auto exposure unit chooses the second brightness interval from the plural brightness intervals according to the image information of the original dynamic image, the tone adjusting unit chooses the second tone mapping adjusting curve to adjust the brightness of the original dynamic image according to the second instruction.

5. The image recording device according to claim 2, wherein the plural tone mapping adjusting curves comprise a first tone mapping adjusting curve, a second tone mapping adjusting curve and a third tone mapping adjusting curve, wherein the curvature of the first tone mapping adjusting curve is less than the curvature of the second tone mapping adjusting curve, and the curvature of the second tone mapping adjusting curve is less than the curvature of the third tone mapping adjusting curve.

6. The image recording device according to claim 5, wherein the plural brightness intervals comprise a first brightness interval, a second brightness interval and a third brightness interval, wherein an ISO sensitivity of the first brightness interval is more than 800, an ISO sensitivity of the second brightness interval is less than or equal to 800 and more than 400, and an ISO sensitivity of the third brightness interval is less than or equal to 400, wherein when the auto exposure unit chooses the first brightness interval from the plural brightness intervals according to the image information of the original dynamic image, the tone adjusting unit chooses the first tone mapping adjusting curve to adjust the brightness of the original dynamic image according to the second instruction, wherein when the auto exposure unit chooses the second brightness interval from the plural brightness intervals according to the image information of the original dynamic image, the tone adjusting unit chooses the second tone mapping adjusting curve to adjust the brightness of the original dynamic image according to the second instruction, wherein when the auto exposure unit chooses the third brightness interval from the plural brightness intervals according to the image information of the original dynamic image, the tone adjusting unit chooses the third tone mapping adjusting curve to adjust the brightness of the original dynamic image according to the second instruction.

7. The image recording device according to claim 1, wherein the image recording device uses a zig zag video high dynamic range imaging technology.

8. An image processing method for an image recording device, the image recording device comprising a detecting module and an image signal output module, the detecting module comprising a detecting unit, a data statistics unit and a tone adjusting unit, the tone adjusting unit comprising plural preset and different tone mapping adjusting curves, the image signal output module comprising an auto exposure unit and a dynamic contrast adjusting unit, the auto exposure unit comprising plural preset brightness intervals, the image processing method comprising steps of:

(a) capturing an original dynamic image according to an exposure value and outputting an image information of the original dynamic image by the detecting unit;

(b) receiving the image information of the original dynamic image, gathering the statistics of the image information of the original dynamic image and outputting the image information of the original dynamic image by the data statistics unit;

(c) receiving the image information of the original dynamic image transmitted from the data statistics unit and issuing a first instruction to the detecting unit according to the image information of the original dynamic image by the auto exposure unit, adjusting the exposure value by the detecting unit according to the first instruction, comparing and obtaining a nearest brightness interval from the plural brightness intervals according to the image information of the original dynamic image and issuing a second instruction to the tone adjusting unit according to the nearest brightness interval by the auto exposure unit, choosing the corresponding tone mapping adjusting curve from the plural tone mapping adjusting curves to adjust the brightness of the original dynamic image according to the second instruction and outputting the image information of an adjusted dynamic image by the tone adjusted unit; and (d) receiving the image information of the adjusted dynamic image transmitted from the tone adjusting unit and outputting the adjusted dynamic image correspondingly by the dynamic contrast adjusting unit.

9. The image processing method according to claim 8, wherein a curvature of the tone mapping adjusting curve is the ratio between the brightness of the original dynamic image and the brightness of the adjusted dynamic image.

10. The image processing method according to claim 9, wherein the plural tone mapping adjusting curves comprise a first tone mapping adjusting curve and a second tone mapping adjusting curve, wherein the curvature of the first tone mapping adjusting curve is less than the curvature of the second tone mapping adjusting curve.

11. The image processing method according to claim 10, wherein the plural brightness intervals comprise a first brightness interval and a second brightness interval, wherein an ISO sensitivity of the first brightness interval is more than 800, an ISO sensitivity of the second brightness interval is less than or equal to 800, wherein when the auto exposure unit chooses the first brightness interval form the plural brightness interval according to the image information of the original dynamic image, the tone adjusting unit chooses the first tone mapping adjusting curve to adjust the brightness of the original dynamic image according to the second instruction, wherein when the auto exposure unit chooses the second brightness interval from the plural brightness intervals according to the image information of the original dynamic image, the tone adjusting unit chooses the second tone mapping adjusting curve to adjust the brightness of the original dynamic image according to the second instruction.

12. The image processing method according to claim 9, wherein the plural tone mapping adjusting curves comprise a first tone mapping adjusting curve, a second tone mapping adjusting curve and a third tone mapping adjusting curve, wherein the curvature of the first tone mapping adjusting curve is less than the curvature of the second tone mapping adjusting curve, and the curvature of the second tone mapping adjusting curve is less than the curvature of the third tone mapping adjusting curve.

13. The image processing method according to claim 12, wherein the plural brightness intervals comprise a first brightness interval, a second brightness interval and a third brightness interval, wherein an ISO sensitivity of the first brightness interval is more than 800, an ISO sensitivity of the second brightness interval is less than or equal to 800 and more than 400, and an ISO sensitivity of the third brightness interval is less than or equal to 400, wherein when the auto exposure unit chooses the first brightness interval from the plural brightness intervals according to the image information of the original dynamic image, the tone adjusting unit chooses the first tone mapping adjusting curve to adjust the brightness of the original dynamic image according to the second instruction, wherein when the auto exposure unit chooses the second brightness interval from the plural brightness intervals according to the image information of the original dynamic image, the tone adjusting unit chooses the second tone mapping adjusting curve to adjust the brightness of the original dynamic image according to the second instruction, wherein when the auto exposure unit chooses the third brightness interval from the plural brightness intervals according to the image information of the original dynamic image, the tone adjusting unit chooses the third tone mapping adjusting curve to adjust the brightness of the original dynamic image according to the second instruction.

14. The image processing method according to claim 8, wherein the image recording device uses a zig zag video high dynamic range imaging technology.

* * * * *